May 9, 1944.　　　　　L. BARNETT　　　　　2,348,201
MANUFACTURE OF INFUSION PACKAGES WITH HANDLES
Filed July 12, 1941　　　　8 Sheets-Sheet 3
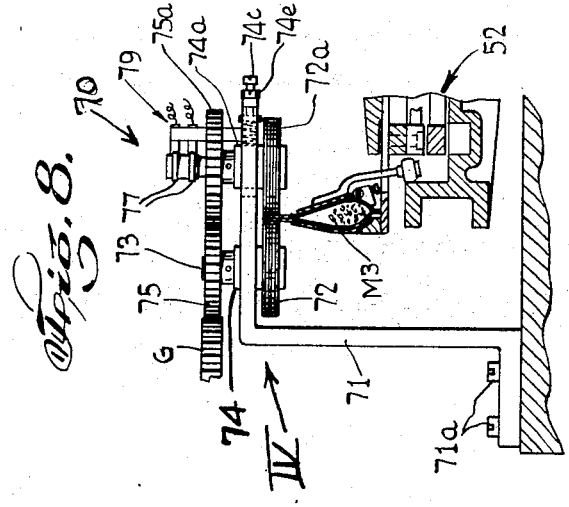
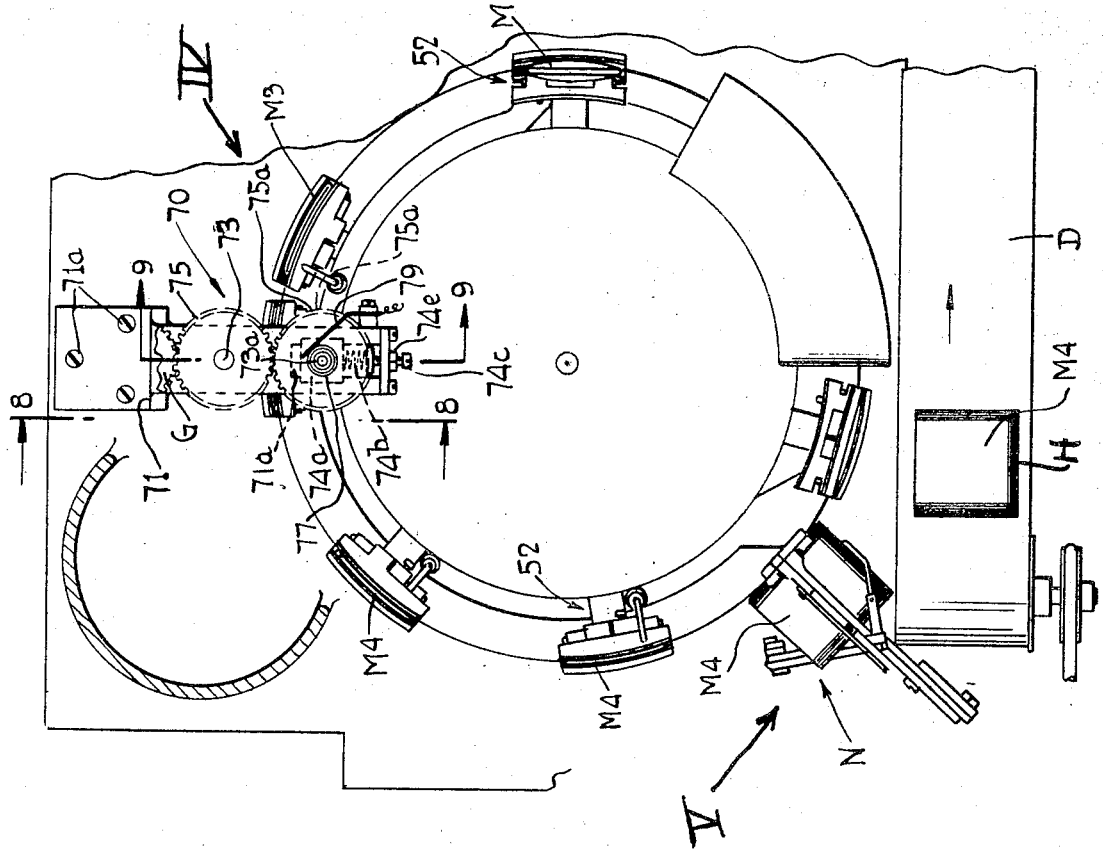
Louis Barnett
INVENTOR.

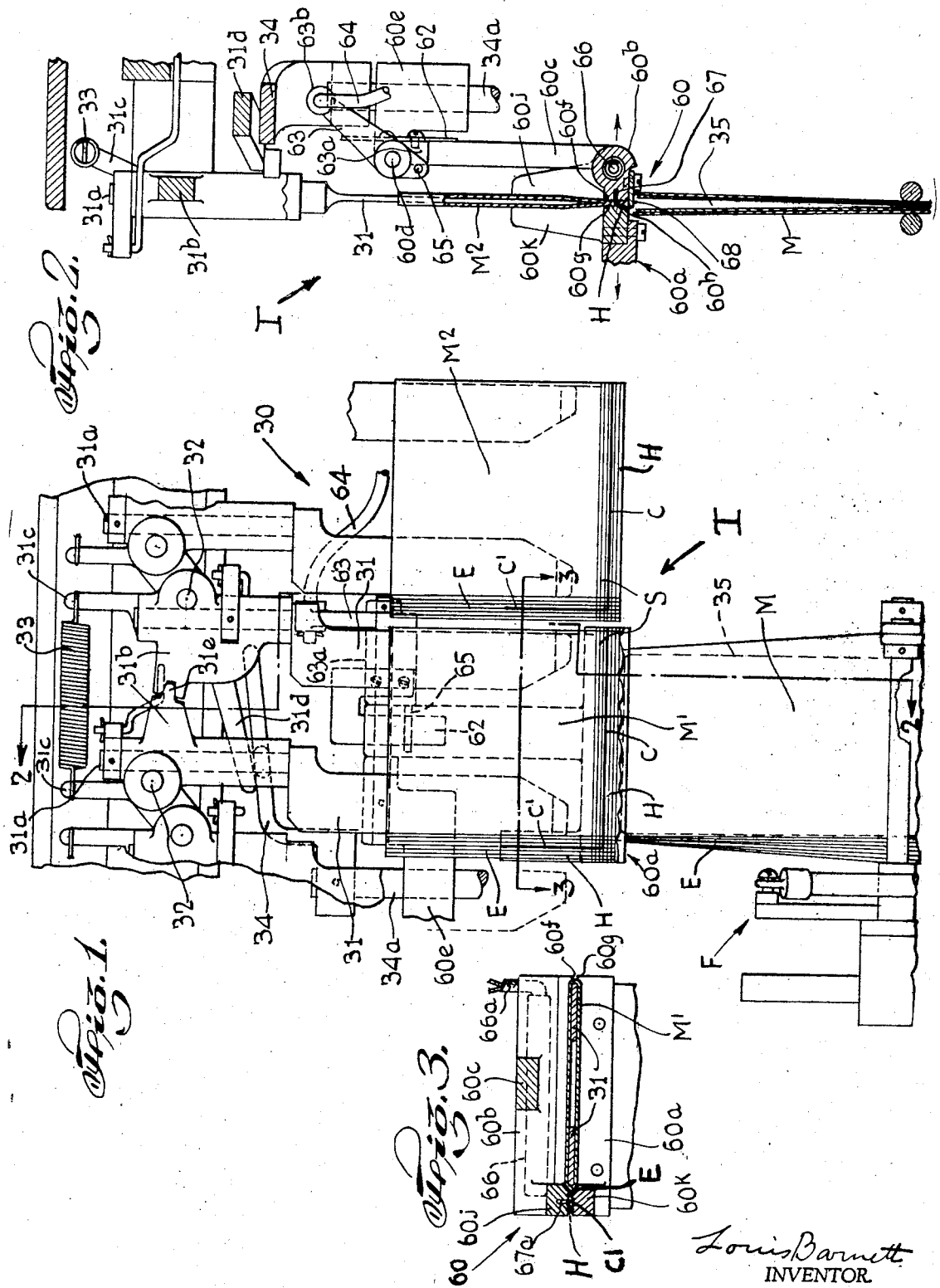

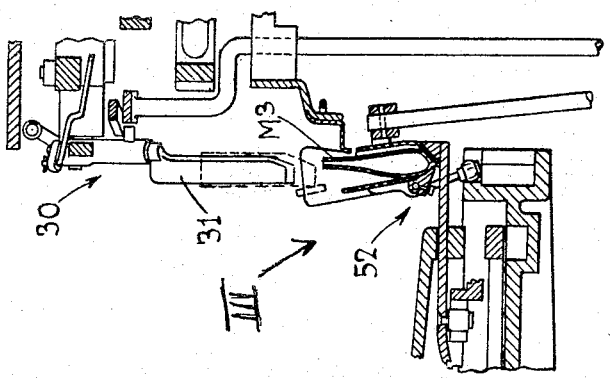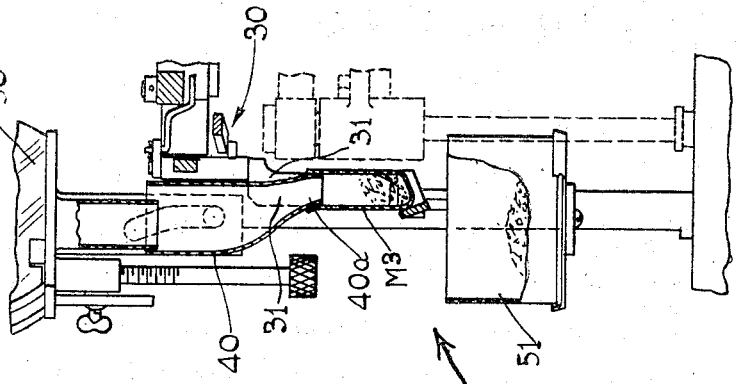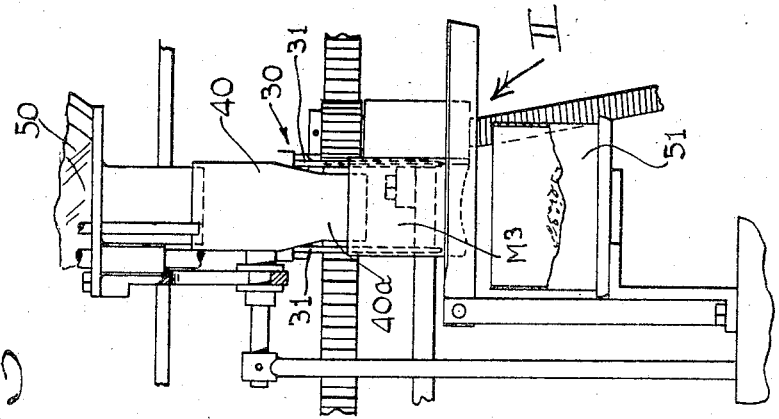

May 9, 1944. L. BARNETT 2,348,201
MANUFACTURE OF INFUSION PACKAGES WITH HANDLES
Filed July 12, 1941 8 Sheets-Sheet 4
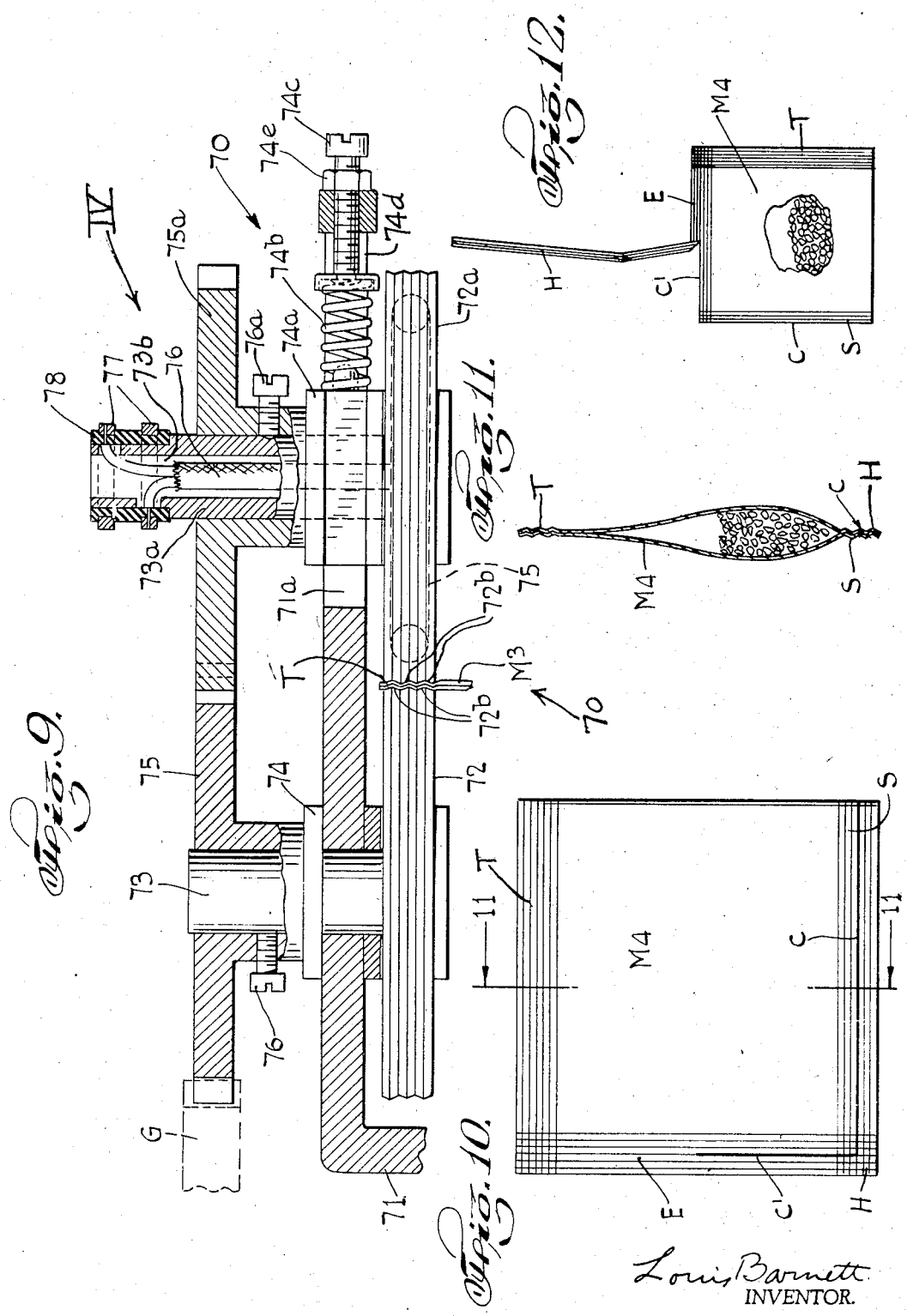

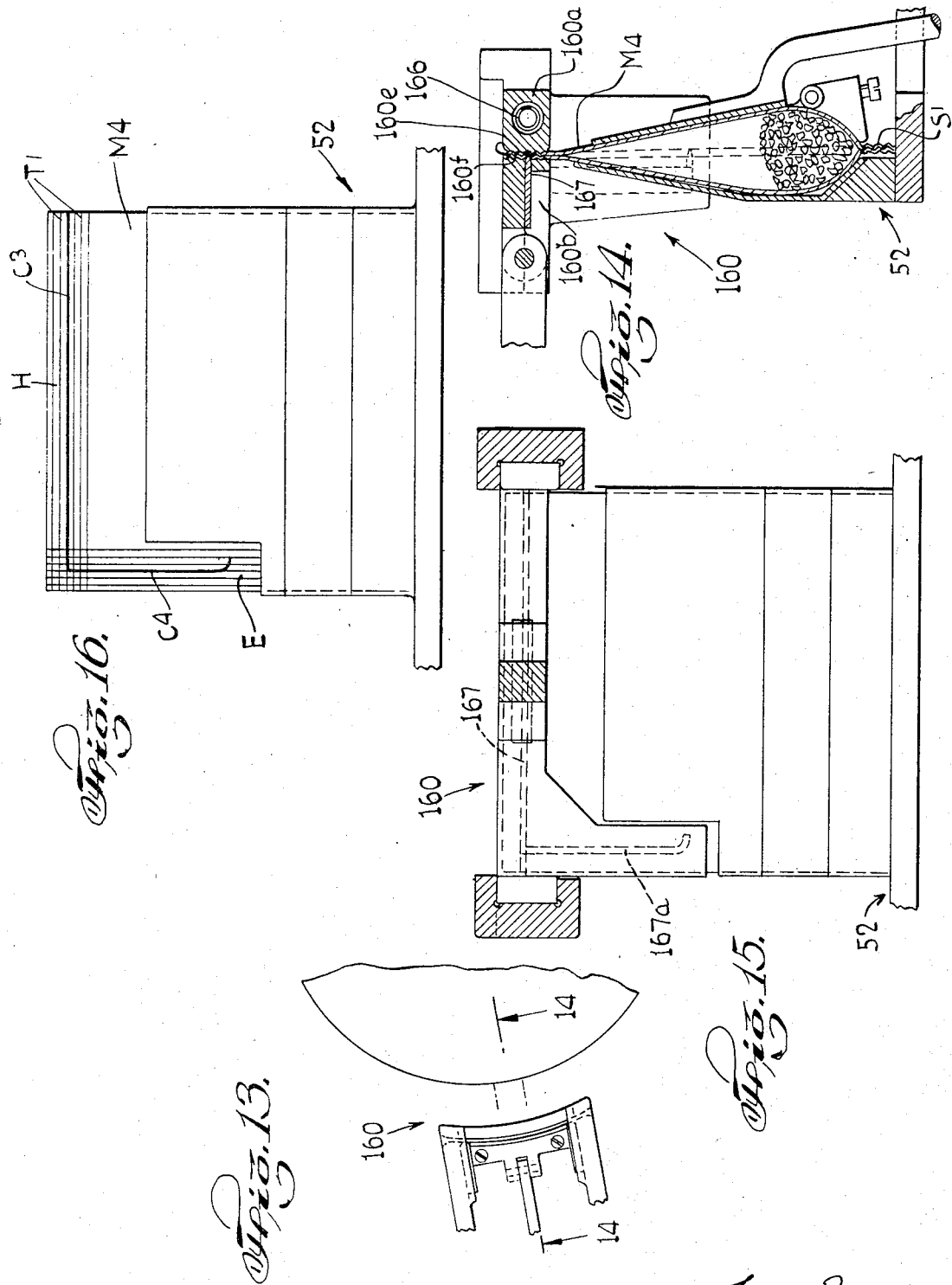

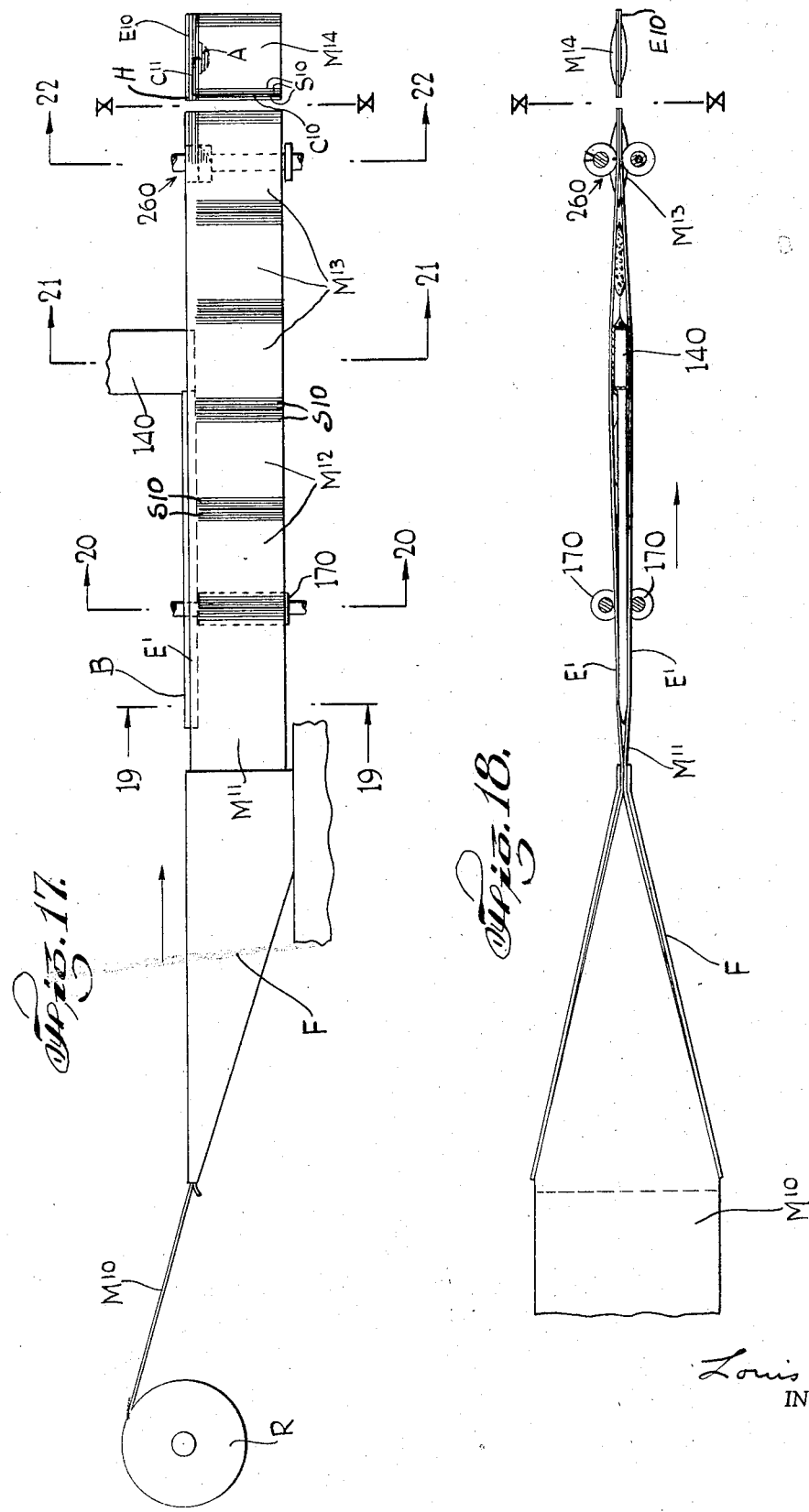

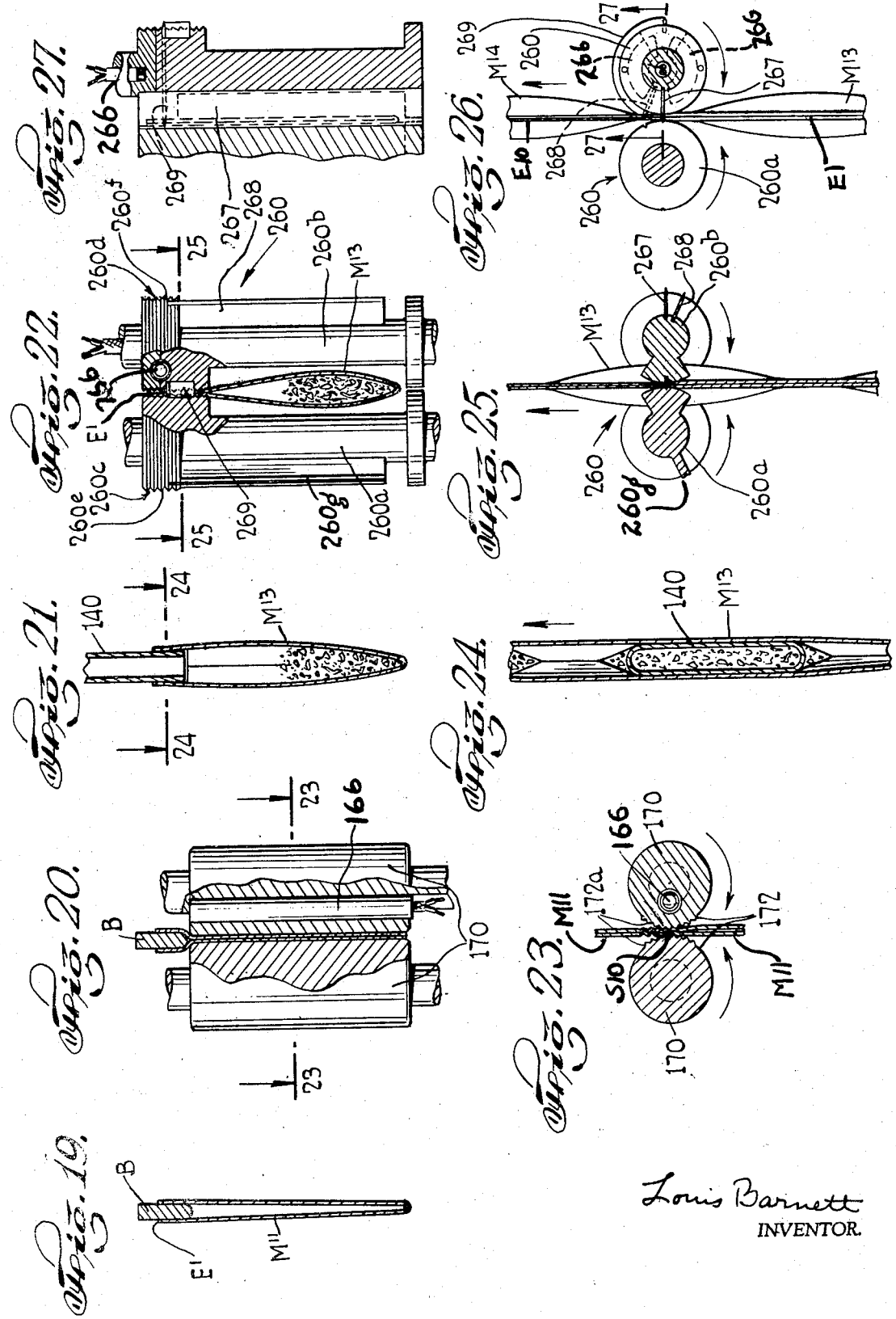

May 9, 1944.    L. BARNETT    2,348,201
MANUFACTURE OF INFUSION PACKAGES WITH HANDLES
Filed July 12, 1941    8 Sheets-Sheet 8
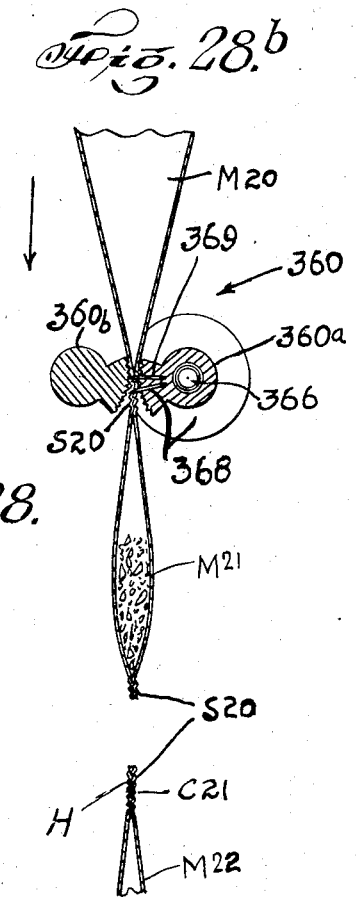
Fig. 28.b
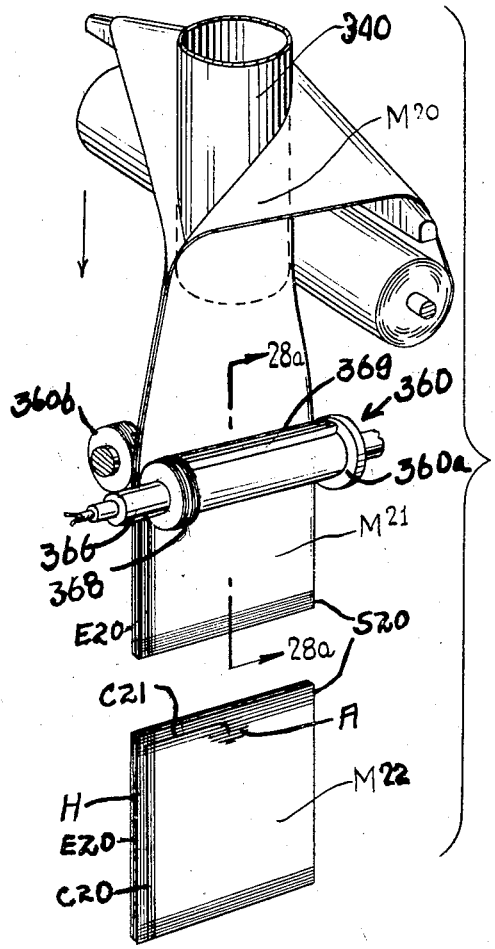
Fig. 28.
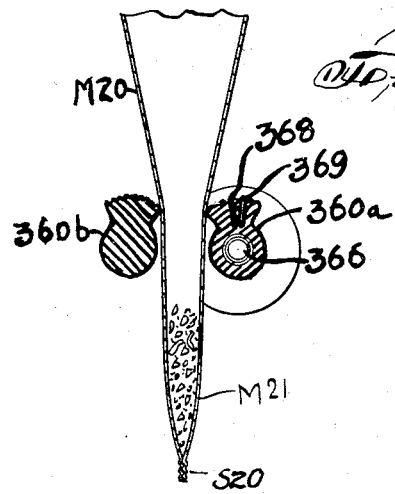
Fig. 28a.
Louis Barnett
INVENTOR.

Patented May 9, 1944

2,348,201

UNITED STATES PATENT OFFICE 2,348,201

MANUFACTURE OF INFUSION PACKAGES WITH HANDLES

Louis Barnett, Brooklyn, N. Y., assignor, by mesne assignments, to National Urn Bag Co., Inc., Long Island City, N. Y.

Application July 12, 1941, Serial No. 402,171

21 Claims. (Cl. 93—3)

This invention relates to the manufacture of filled containers or bags, and more particularly is directed to portions or mechanisms of machines such as used for making tea-balls or similar packages in which a portion of a sealed joint structure is formed into a handle or tag and handle.

Among the objects of the invention is to generally improve portions of a mechanism of tea-ball making or like machines which shall comprise few and simple parts, which shall be easy to assemble, which shall be readily incorporated in various types of partly and fully automatic existing packaging machines producing tea-balls or the like articles for eliminating the usual string handles or string handles and tags, which shall also be adapted for incorporation as part of newly constructed high speed packaging machines and when so incorporated in either existing or newly constructed machines permitting an increase in the normal output capacity thereof, and which shall be practical and efficient to a high degree in operation.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

This case is a continuation in part of my application, Serial No. 380,628, filed February 26, 1941, for Infusion packages with handles and the method of manufacturing same.

In the accompanying drawings, in which is shown various possible illustrative embodiments of this invention, Figs. 1 and 2 are fragmentary front and side elevational views, respectively, showing a depending type of tea-ball bag carrier with a bottom closure heat sealing and handle forming mechanism embodying the invention for incorporating in an automatic tea-ball making machine; Fig. 2 being a section taken on line 2—2 in Fig. 1;

Fig. 3 is a cross-sectional view taken on line 3—3 in Fig. 1 showing the heat sealing and handle cutter portion of the mechanism;

Figs. 4 and 5 are fragmentary side and front elevational views of the filling portion of the tea bag package making machine showing the filling operation of the bag on the carrier after the bottom closure is applied to the bag by the mechanism shown in Figs. 1 to 3, inclusive; Fig. 5 being partly in section;

Fig. 6 is a side elevational view, partly in section, of a fragmentary portion of an open ended filled bag transferring means of the tea-ball manufacturing machine;

Fig. 7 is a plan view of a fragmentary portion of a filled bag transferring portion of a tea-ball manufacturing machine with the mechanism for applying the top closure to the filled bag and a discharge transfer for the finished tea-balls;

Figs. 8 and 9 are views taken on lines 8—8 and 9—9, respectively, in Fig. 7, Fig. 9 being an enlarged cross-sectional view showing in detail the construction of portion of the top closure heat sealing means;

Fig. 10 is a front elevational view showing an improved finished tea-ball with an integrally formed handle manufactured on machines incorporating the invention as shown in Figs. 1 to 9, inclusive;

Fig. 11 is a cross-sectional view of the tea-ball taken on line 11—11 in Fig. 10;

Fig. 12 is a front elevational view of the tea-ball shown in Figs. 10 and 11 with the handle portion extended for manipulating the tea-ball when brewing;

Fig. 13 is a plan view of a fragmentary portion of a filled bag carrier and top sealer of a tea-ball making machine showing a modified form of the invention for forming the integral handle in the heated sealed top closure structure of the filled tea-balls;

Fig. 14 is an enlarged detailed cross-sectional view taken on line 14—14 in Fig. 13;

Fig. 15 is a fragmentary elevational view of a tea-ball machine showing portions of the filled bag carrier with the top closing heat sealing and handle forming mechanism in effective position corresponding to Figs. 13 and 14;

Fig. 16 is a view of the tea-ball machine portion showing part of the bag carrier with a finished tea-ball with the top closure applied and handle completely formed in the mechanism shown in Figs. 13 to 15;

Fig. 17 is a front elevational view showing portion of another tea-ball making machine having the tea charging portion extending in from a longitudinal edge of the travelling folded strip and incorporating mechanisms embodying the invention, the top rollers of said mechanisms being omitted to expose the heat sealing and cutting operations, one completed tea-ball with the integral handle being shown severed from the adjoining partly finished tea-ball;

Fig. 18 is a top plan view of the portion of the tea-ball making machine shown in Fig. 17;

Figs. 19 and 21 are sectional views taken on lines 19—19 and 21—21, respectively, in Fig. 17;

Figs. 20 and 22 are sectional views taken on lines 20—20 and 22—22, respectively, in Fig. 17, but including the upper rollers;

Figs. 23 and 24 are sectional views taken on line 23—23 in Fig. 20 and on line 24—24 in Fig. 21, respectively;

Fig. 25 is a sectional view taken on line 25—25 in Fig. 22;

Fig. 26 is a top plan view of the mechanism shown in Fig. 22;

Fig. 27 is a fragmentary sectional view taken on line 27—27 in Fig. 26;

Fig. 28 is a perspective view showing portion of still another tea-ball making machine having the tea charging portion extending in from an end of the travelling folded strip and incorporating mechanisms embodying the invention, one completed tea-ball with the integral handle being shown severed from the adjoining partly finished tea-ball;

Fig. 28a is a sectional view taken on line 28a—28a in Fig. 28; and

Fig. 28b is a cross-sectional view showing the concurrent heat sealing and through-cutting of the seam joint structure formed to provide the integral handle therefrom.

In my co-pending application above referred to, there is disclosed improved filled containers or packages and more particularly tea-ball constructions with integrally formed handles or tags and handles and methods of manufacture. Since the successful and practical commercial utility of such improvement depends on the adaptability of producing such packages in large scale quantity production on automatic machines, it is to carry out one object of the invention to incorporate improved mechanisms in existing automatic machines of different operating types. To this end in Figs. 1 to 13, inclusive, there is shown the incorporation of the present invention in a high speed fully automatic tea-ball machine constructed like that shown and described in the co-pending application of Mervin Allatt, Serial No. 37,257, filed August 21, 1935. Sufficient portions of said machine being included herein as will enable the different features of the present invention to be understood, and except as to the detail of construction and modes of operation to be pointed out, the bag forming apparatus may and preferably as shown in such figures comprise the machine illustrated in said Allatt patent application to which reference may be made for a complete description thereof.

Referring now to Fig. 1, 30 denotes a depending bag carrier portion of such Allatt fully automatic machine which is supplied from a suitable source (not shown) with tubular sheet material M in the form of a double strip by a feeding mechanism F, said material supply source and feeding mechanism F being constructed and arranged like that shown and described in the above invention in the Allatt application.

Said tubular sheet material M may be of foraminous construction, as for example, filter paper, perforated parchment paper or Cellophane, cotton gauze and the like. That used in the practice of the invention here described comprises a filter paper base layer coated on one side with a thermosetting "partially fused" plastic lamina for forming the heat sealed border joint seams by bringing a marginal edge portion into contact and heat sealing same in the manner hereinafter described. For example, a continuous web of filter sheet material of suitable dimension may be folded over on itself with the "partially fused" plastic lamina on the inner surface and with the marginal edges thereof in contact. On heat sealing said marginal edge seam joint E along the entire length thereof, the tubular sheet material M is formed. Said material M may be fed into the machine in the form of the double strip by mechanism F, the latter being only partly shown in Fig. 1.

The tubular material M fed by mechanism F is adapted to have its upper or leading end mounted on a spaced pair of fingers 31 of the depending bag carrying portion 30 as shown in Figs. 1 and 2. To facilitate said mounting, the feed mechanism F as seen from Fig. 2 includes a wedge-shaped tongue 35 which extends down within the leading end of the tubular material M and serves as a means for spreading said end whereby the fingers 31 may readily enter and engage therein. Said mechanism F intermittently raises the tubular structure M onto the fingers 31 by suitable interconnecting devices the predetermined distance corresponding to the desired length of a bag, and then releases the material M permitting the tongue 35 to drop down within said material M a sufficient distance to clear a heat sealer and cutter mechanism 60. The mechanism F is then positioned for feeding the next section unit of said material M for forming another bag.

A complete description of such feed mechanism F is given in the said co-pending application of Mervin Allatt.

Each pair of fingers 31 of bag carrier portion 30 supporting the bag section unit M1 cut from material M in its first stage of manufacture are suitably journalled for turning on their end shaft portions 31a and are coupled through cooperating toothed segment members 31b, said segment members 31b being pivotally mounted on stud shafts 32.

As seen from Figs. 1 and 2, the segment members 31b carry upstanding posts 31c which are interconnected by a tension coil spring 33 tending to keep the fingers 31 in extended spread position, namely, in substantially parallel alignment. The action of said coil spring is sufficient to put a slight strain on the material of the bag section unit M1 engaged thereon. The turning of segment member 31b for moving the fingers 31 to and from each other is accomplished by means of a movable arm 34 which may be pinned to move with the end of a vertically extending rod 34a. The lower end of said rod 34a (not shown) is extended for intermittent operation by suitable mechanisms in timed relation with other mechanisms of the machine. The movable arm 34 when operated is projected in the path of movement of an extending portion 31d of segment 31b to press said portion 31d for swinging the segments 31b which are interlocked through teeth 31e against the action of the spring 33 to bring the fingers 31 together so that they will more readily enter the open upper or leading end of the material M.

In order to form the tubular unit section M1 into a bag of a tea-ball with a bottom closure S and an integral handle H, a heat sealer and cutter mechanism 60 is provided, and as seen from Figs. 1 to 3, inclusive, said mechanism 60 comprises a relatively fixed pressure jaw 60a secured to a relatively stationary portion of the machine and a movable jaw member 60b. The movable member 60b terminates the lower end of an arm 60c, the other end of said arm 60c being mounted for rocking movement on a stud shaft 60d supported by a bracket 60e from another relatively stationary part of the machine. The arm 60c with jaw member 60b swings on stud shaft 60d against the action of a suitable flat spring 62 carried at one end 63a of a lever 63, said lever end 63a also being pivoted on the shaft 60d as shown in Figs. 1 and 2. The other end 63b of said lever 63 may connect with an actuating rod 64 and carries a pin 65 which is adapted to actuate arm 60c for retracting the jaw member 60b to release the bag bottom closure S from between jaw member 60b and fixed jaw 60a of the heat sealer and cutter 60.

Said jaw member 60b may have embedded therein an electric heater 66 of any suitable well understood construction and preferably is provided with a corrugated clamping surface 60f which registers with a mating corrugated clamping surface 60g of the fixed jaw 60a. The electric heater 66 may be connected to a suitable power supply (not shown) through conductor wires 66a in any well understood manner.

Carried by the movable jaw member 60b are two spaced cutting blades 67 and 68, blade 67 acting against the face of jaw surface 60g while blade 68 cooperates with the edge 60h of jaw 60a as shown in Fig. 2. When the jaw members 60b are brought against jaw 60a with the leading end portion of tubular material M therebetween to form the bottom closure joint seam S thereon, the blade 68 severs the formed bag section unit M1 from the strip of tubular material M and simultaneously heat seals the bottom closure seam joint S while the blade 67 through-cuts a portion of said closure seam joint S as at C short of detachment and at the same time continues said through-cut C along the side seam joint E as at C1 of the section unit M1. A blade 67a provided on an angular extension 60j of jaw member 60b forming a continuation of blade C7 coacting with angular extension 60k of jaw member 60a serves to make the through-cut portion C1 for completing the construction of integral handle H from portions of joint seams S and E as shown in Figs. 1, 2 and 3.

The above described mechanism is located as will hereinafter be referred to as the "first station" I, and the section unit M1 with the bottom closure applied thereto forms bag M2 thereat. At a "second station" II, the carrier 30 with bag M2 has advanced from the "first station" I and fingers 31 turned so that the wide sides thereof are in parallel alignment for spreading apart the top or open end of the bag M2, as shown in Figs. 4, 5 and 6. This turning movement of the fingers 31 is accomplished by supporting them for vertical rotation in unison from a position of alignment with the flat sides thereof in the same plane as shown in Figs. 1 and 2 to an alignment with said flat sides in parallel planes as shown in Figs. 4, 5 and 6 to permit the bag M2 to receive a charge of tea. The rotary movement of said fingers 31 is accomplished by suitable connection as shown in the drawings and in proper timed relation as is fully described in the above mentioned co-pending Allatt application.

The bag M2 on the fingers 31 when opened up to receive a charge of tea at the "second station" II is located to permit the lower spout portion 40a of a hopper 40 to enter therein. This spout portion 40a is raised and lowered by a suitable connecting actuating means in timed relation with the other parts of the machine. A rotary measuring device 50 automatically delivers uniform charges of tea to the bags M2 at the "second station" II through the hopper 40 and spout portion 40a. While the moving parts of the bag carrier 30 remain relatively stationary, the spout portion 40a is raised from its lower position shown in Figs. 4 and 5 after filling said bag M2 by a suitable elevation means for clearing the path of movement of the carrier 30 to permit further advancing the same in the manner described in said Allatt application.

There may also be provided a suitable container 51 for receiving spillage from the spout portion 40a and from damaged, torn or defective filled bags M3 positioned under the rotary measuring device 50.

The bags M3 after they have been successively filled at the "second station" II may be advanced by said carrier 30 to a "third station" III, shown at Fig. 6, where each filled bag M3 is transferred to the mechanism 70 at a "fourth station" IV for heat sealing the top closure seam T, shown in Figs. 7, 8 and 9. To this end, the fingers 31 which at the "second station" II were effective to hold the open end of the bag M3 at the "third station" III swing toward each other sufficiently to release the bag M3. The filled bag M3 then drops down into a receptacle conveyor 52 and is advanced to the top closure apparatus 70 at a "fourth station."

Said mechanism 70 as shown in Figs. 7, 8 and 9 may be suitably mounted to the frame of the machine by support fitting 71 and bolts 71a.

Said fitting 71 carries a pair of cooperating rollers 72 and 72a having rolling grooved surfaces 72b in register constructed and arranged to lie in the path of the advancing filled bag M3 at the level of the top opening thereof, the roller 72 being mounted to rotate with an under end of a shaft 73 journalled in a bearing 74 secured in the support fitting 71. The upper end of the shaft 73 extending through the bearing 74 has a gear 75 mounted to turn therewith, a set screw 76 being provided to secure the gear 75 to said shaft 73.

The roller 72a is mounted to rotate with an under end of a shaft 73a, said shaft 73a being supported in spaced parallel alignment with shaft 73, and journalled in an adjustable bearing 74a, the latter being movably mounted in a slot 71a provided in supporting fitting 71. The upper end of the shaft 73a extending through bearing 74a has a gear 75a mounted to turn therewith and secured to the shaft 73a by a suitable set screw 76a. Gears 75 and 75a are assembled in meshing relation and may be driven by gear G connected with the machine power drive.

The gears 75 and 75a rotate rollers 72 and 72a in opposite directions. The adjustable bearing 74a may include a coil spring 74b and a suitable screw compression control 74c so that the bearing 74a may resiliently support the grooved roller 71a against roller 71. When the filled bag M3 advances toward the mechanism 70, the top of the bag M3 enters between the grooved rollers 72 and 72a, at which time the adjustable bearing 74a gives a sufficient amount along slot 71a against the action of the spring 74b to allow for the thickness of the bag material at the top closure, as seen from Fig. 9. The screw compression control 74c includes a seating piece 74d and locknut 74e which permits adjustably setting the resilient action of the rollers 72 and 72a for the top closure sealing operations.

Heat for sealing the top closure may be supplied to rollers 72 and 72a by suitable means, as for example by electric heater 75 embedded in roller 72a, and as shown in Fig. 9, said heater having conductor wires 76 which pass axially up through hollow 73b. Spaced slip or collector rings 77 terminate said wires 76, said rings 77 being mounted on an insulating base 78 carried by shaft end 73a above the gear 75a. Electric power from a suitable source (not shown) is fed into the rings 77 by brush connection 79, as shown in Fig. 7.

As the filled bags M3 are sealed with top closure T and leave the "fourth station" IV they are completely finished as tea-balls M4 shown in Figs. 10 to 12. Said tea-balls M4 then may be delivered to a packing station through suitable discharge equipment, such as a chute or conveyor (not shown) or as shown in Fig. 7, the finished tea-balls M3 are advanced to a "fifth station" V where the bags are picked up by a transfer mechanism N and delivered to a discharge belt conveyor D from which they may be removed for packaging and shipment. The mechanism N and conveyor D may be operated in timed relation with the complete manufacture of the tea-ball M4 through interconnecting driving means, such as explained in detail in said Allatt application.

In the above described construction of a tea-ball M4 made by the machine incorporating the embodiment of the invention, the handle H is made an integral part of the bottom seam joint S and portion of the edge seam joint E. It is to be understood that the invention may also be incorporated in other portions of machines like that disclosed in said Allatt application, as for example, by first forming an ordinary bottom sealed joint without any through-cuts C and C1, in which case the heat sealer and cutting mechanism 60 is constructed with pressure jaws 60a and 60b of less width, and the blades 61 and 61a as well as the extensions 60j and 60k to jaw members 60a and 60b, respectively, are omitted, thus forming a heat sealed joint S1 at the "first station" I, of simple uncut construction, as shown in Fig. 14. The forming of the integral handle H, however, may be made instead at the "fourth station" IV by providing therefor on the top closure joint seam T1. The construction of the mechanism 160 to produce the latter is shown in Figs. 13 to 16, where the filled bag M3 with the simple bottom closure S1 as it is carried by the receptacle conveyor 52 is advanced to said top closure mechanism 160 at another "fourth station" IV instead of mechanism 70 above described.

The mechanism 160 may comprise a pair of jaw members 160a, 160b; the latter being mounted for sliding movement to and away from jaw member 160a which is mounted in a relatively fixed position. The fixed jaw member 160a may have embedded therein a suitable electric heater 166 of any well known construction and said jaw member 160a may be provided with a corrugated clamping surface 160e which registers with a mating clamping surface 160f of the movable jaw member 160a. The electric heater 166 may be connected to a suitable power source (not shown) in the well understood manner. Carried by the movable jaw 160b is a cutting blade 167, said blade coacting with the face 160e of the jaw member 160a. When the jaw 160b is brought against the jaw 160a with the top closure portion of the filled bag M3 therebetween and power applied to the electric heater 166 of the jaw 160a, the top closure joint T1 is sealed and the blade 167 through-cuts at C3 a portion of the top closure seam joint T1. At the same time said through-cut C3 is continued down along the upper end portion of the side seam joint E at C4. A blade 167a provided on an extension of the jaw 160b forms a continuation of the blade 167 and serves to make the through-cut portion C4 for completing the construction of the integral handle H from portions of the seam joints T1 and E as shown in Figs. 15 and 16. In the construction for providing the handle H as part of the top closure seam joint T1 instead of the bottom closure S, the packaging machine operates otherwise alike in the two constructions and the finished tea-balls M4 produced by both constructions are substantially alike in all respects, as shown in Figs. 10 to 12.

Thus far the invention has been described as incorporated in a specific type of packaging machine. It is to be understood that the present invention is equally applicable for incorporation in other existing types or to newly constructed packaging machinery. In Figs. 17 to 27, inclusive, an embodiment of the invention is shown as may be applied to a packaging machine in which a continuously travelling strip of filter sheet material M10 which is formed into the bags of the package manufactured is provided from a continuous web conveniently supplied from reel R. Said web M10 is folded longitudinally along a mid-portion thereof by a suitable device F, the open edge portion E1 of the folded strip M11 being retained separated by a suitable bar B, there being provided a suitable heat sealing seam joint means extending across the folded web in the form of a pair of rollers 170, as shown in Figs. 17, 18, 20 and 23, which form the folded web M11 into a continuous series of adjoining bag units M12, said sectionalized bag units M12 being formed in alignment just short of the open edge portions E1 at the top open sides of said bag units M12. For heating the rollers 170 a suitable electric heater 166 may be embedded in one of said rollers and connected with a power source (not shown) in the well understood manner.

The rollers 170 as seen from Figs. 20 and 23 terminate just below the under side of the bar B and have coacting pressure portions 172 extending in a direction transverse to the direction of travel (as shown by arrows in Figs. 17 and 18) of the folded web M11, said pressure portions 172 extending from the surface along a portion of the length of said rollers and being of sufficient width to form cross seam joints S10 on the adjoining bag units M12 when the travelling folded web M11 passes between said rollers 170. Said roller pressure portion 172 may be provided with registering grooved surfaces 172a for corrugating the seam joints S10 formed.

As the adjoining bag units M12 are advanced they pass in the path of a charging means 140 (only the spout being shown in Figs. 17, 21 and 24), where uniform quantities of tea are successively fed to form the adjoining filled bag units M13. Thereafter the upper side openings of said filled bag units M13 are heat sealed and said cross seamed joints S10 severed by heat sealing and severing mechanism 260.

Said mechanism 260 as here shown in detail in Figs. 22 and 25 to 27, inclusive, may comprise a pair of rollers 260a, 260b, the upper continuous perimetric portion thereof 260c and 260d, respectively, having grooved surfaces 260e and 260f which are in register for receiving between them the upper open edge portions E1 of said filled bag units M13. The roller portion 260d may have embedded therein a suitable electric heater 266 connected in the well understood manner to a suitable power source (not shown) for use in the heat sealing operation. Extending along the roller 260b is a knife 267 which is adapted to cooperate with the surface portion 260g of the roller 260a, said knife 267 extending the entire length of the latter and is sufficient to completely split the cross seam joint S10 so that when the rollers 260a and 260b operate said portions 260c and 260d thereof function to heat seal the side openings E10 of filled bag units M13 and at the same time cutting off the sealed bags M14 to completely sever the leading bag M14 as at X—X (see Figs. 17 and 18) from successively adjoining bags. Concurrently, portions of the adjacent cross seam joint S10 and the top sealed joint E10 are cut through at C10 and C11 short of detachment to provide the handle H, the finished package M14 being like package M4 above described and shown in Figs. 10 to 12.

To through-cut C10, a blade 268 spaced from the knife 267 may be provided on roller 260b, said blade 268 being somewhat shorter than the knife 267 so as to leave portion of the sealed joint E10 uncut. The through cut C11 extending partially along the length of the sealed joint E10 is made a continuation of the through-cut C10 to complete the formation of handle H by providing curved blade 269 on roller 260b as shown in Figs. 26 and 27. The mechanism 260 is thus seen to have parts such as rollers 260a and 260b, perimeter portions 260c and 260d, bag severing knife 267, handle cutting blades 268 and 269 so proportioned and assembled that one revolution of said rollers 260a and 260b covers a distance just equal to the spacing of the adjoining bag units M13 and their respective handles H. The knife 267 and blades 268 and 269 may be retained in place by suitable fastening means as for example screws 267a, 268a and 269a, respectively.

It is contemplated in utilizing the present invention to shape, modify and arrange the through cutting means and tag area formations in the construction described above and shown in the drawings to provide various shaped handles and tags by either adding, subtracting, lengthening or shortening the cutting blades or otherwise modifying the configurations of the pressure heat sealing means to provide any of the various forms of packages shown and described in my said copending application.

If desired, the perimetric roller portions 260c and 260d may be so shaped that the heat sealed seam joint E10 is formed to have an imprinting area A at the portion thereof about the termination of the end of the through-cut C11.

Still another application of the invention is shown in Figs. 28, 28a and 28b. Here the invention is incorporated in a packaging machine which also forms the tea-ball packages from a single continuous travelling web M20 folded longitudinally but which is charged with tea in the direction of the travel of the web instead of transverse such travel as described above and shown in Figs. 17 to 27, inclusive. Here the web M20 as it is drawn through the machine is folded or wrapped around a hollow mandrel 340 through which charges of tea are fed during the filling operation and passed between a pair of rollers 360a and 360b of a heat sealing and severing mechanism 360 which heat seals by a suitable heater 366 the longitudinal seam joint E20. The bag unit M21 formed is charged with tea through said mandrel 340 while the mechanism 360 acts to simultaneously heat seal the cross seam joint S20 forming the upper end closure on the leading package M22 and a bottom closure on the bag unit M21 in the process of manufacture, severs said package M22 from the bag unit M21, and forms the handle H by through-cutting the edge joint E20 most of the length thereof but not completely to provide slit C20 and also through-cutting a portion of the cross seam joint S20 to provide slit C21 as a continuation of slit C20 by means of blades 368 and 369 incorporated in the roller 360a in the same manner described above for the mechanism 260, the cutting off, through-cutting and heat sealing being shown of the last described construction in Figs. 28, 28a and 28b.

The filling of the bag units M21 preferably takes place after the bottom closure S20 has been completed and at least the lower portion edge joint E20 finished to avoid accidental spillage of the contents or defective formation of said heat sealed edge seam joint E20, the finished package M22 with the handle H being similar in all respects to packages M14 and M4 described above and shown in Figs. 10 to 12, inclusive.

It will thus be seen that there are provided constructions in which the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. In a packaging machine of the character described, cooperating mechanisms for making and filling bags including means for forming heat sealed closure seam joints, and means carried by the first mentioned means for transforming structural portions of said joints to provide an elongated handle integrally attached at one narrow end thereof for dependingly supporting the filled closed bags thereby.

2. In a packaging machine of the character described, cooperating mechanisms for making, filling and closing bags including means for making heat sealed joints on the bags, said joint making means being constructed and arranged for transforming structural portions of said joints to provide an elongated handle integrally attached at one narrow end thereof for dependingly supporting the filled closed bags thereby.

3. Cooperating mechanisms of a packaging machine for making, filling and closing bags or packages of the character described, portions of said mechanisms including means for forming a heat sealed joint on the structure of each of said bags, and means concomitantly acting with said heat sealed joint forming means for severing a sufficient continuous length of such sealed joint bag structure to provide an elongated handle with a narrow end of the handle integrally connected to the sealed joint for dependently supporting the package bag thereby.

4. The cooperating mechanism defined in claim 3 in which said means for severing the sealed joint bag structure is shaped to provide a tag integrally formed with said package handle.

5. In a machine of the character described for forming packages of filled bags including means for forming a seam joint closure on said bags, and means for through-cutting a mid-portion of the seam joint closure formed by said first mentioned means for a distance of at least one dimension of a bag to provide an integral handle for the package.

6. In the machine defined in claim 5 in which at least one of said means is so constructed and arranged to provide an integral legend bearing portion for the package adjacent an end of the through slit of the seam joint closure.

7. A heat sealing and cutting mechanism of the character described comprising means for pressure heat sealing a seam joint structure on filled bags to form a package, and means for cutting-through a continuous length of said joint structure short of complete severance to provide an integral elongated handle attached at a narrow end thereof for the package.

8. In machines of the character described, co-operating mechanisms to manufacture bags from a continuous strip material for producing filled packages, means for making heat sealed joints in the manufacturing operations of said bags, means for completely severing the bags formed from said strip material, and means for cutting through a substantial continuous length of such joint short of complete severance to provide an elongated integral handle attached at a narrow end thereof for each package.

9. In a mechanism of the character described, means for heat sealing a closure seam joint of a package bag, and means associated with said heat sealing means for severing the structure of said joint short of complete detachment into a shaped contour to form an elongated integral handle attached at a narrow end thereof to the package and a tag area.

10. In the mechanism defined in claim 9 in which said severing means comprises two cutting devices so constructed and arranged to form said handle and tag area from said seam joint structure having a through-cut therein provided by the operation of one of said devices.

11. In a packaging machine of the character described, means for forming adjoining package bags from a continuous strip of material, a heat sealing and cutting mechanism for heat sealing joint closures of said adjoining package bags and for severing the heat sealed joint of a leading package bag to detach the same from the adjoining strip material, and an additional cutter for concurrently severing the joint structure of said leading package bag short of complete detachment to form an elongated integral handle attached at a narrow end thereof.

12. In a packaging machine of the character described, the combination of means for forming adjoining package bags with heat sealed closure joints from a continuous strip of material, and a mechanism for heat sealing said closure joint and for detachably severing the heat sealed closure joint of a leading package bag at a junction, said mechanism including means for through-cutting a portion of the structure short of detachment of said closure joint of each package bag during the heat sealing operation of said joint to form an elongated integral handle attached at a narrow end thereof to the package.

13. In a packaging machine of the character described, means for making and partially filling a bag having heat sealed seam joints and an open end, a plurality of pressure members, means for heating said pressure members, means for moving said pressure means in and out of contact with open end portions of said bag to form a heat sealed joint seam closure thereat, severing means carried by said pressure members constructed and arranged to through-cut a mid portion of said joint seam closure partially the length thereof, said severing means being extended to through-cut said seam joint closure short of detachment to form thereof an elongated dependent integral handle attached at a narrow end thereof to the filled bag.

14. In a machine of the character described for making packages from a preformed continuous tubular structure having a heat sealed seam joint formed lengthwise thereof, a plurality of pressure members, heating means provided in said pressure members, means for bringing said pressure means in and out of engagement with the tubular structure to form a heat sealed bottom closure seam joint of a bag section unit thereof, a plurality of severing means cooperating with said pressure means, one of said latter means for completely cutting off the bag section unit from the tubular structure along said seam joint, and the other severing means for through-cutting a mid-portion of said seam joint short of detachment to form therefrom an elongated dependent integral handle attached at a narrow end thereof to the package.

15. In a packaging machine of the character described, means for forming adjoining package bags from a continuous strip of material, a plurality of pressure members, means for heating said pressure members, means for bringing said pressure members in and out of engagement with a tubular structure formed of said strip for heat sealing seam joint closures of said adjoining package bags constructed thereby, and a plurality of severing means cooperating with the pressure member, one of the latter for completely cutting off a leading package bag at the heat sealed joint from the adjoining tubular structure, another of the latter for concurrently through-cutting the remaining heat sealed seam joint short of detachment to form an elongated integral handle attached at a narrow end thereof to the package bag.

16. In a packaging machine of the character described, means for forming from a continuous tubular structure package bag, a plurality of rollers between which said tubular structure passes, heat sealing means carried by said rollers for forming seam joint closures on adjoining bags formed from said passing structure, and a plurality of cutting means cooperatingly carried by said rollers for completely severing a leading bag from the adjoining bags and for through-cutting a mid-portion of a seam joint closure of each bag short of detachment to form a depending integral handle.

17. In the packaging machine defined in claim 16 in which said cutting means has an additional portion to extend the through-cut beyond said seam joint closure and through at least a portion of an adjacent seam joint for forming the integral handle and a legend bearing bag area.

18. A machine of the character described comprising cooperating mechanisms to manufacture filled packages from a continuous strip material including pressure members for making heat sealed seam joints, a first cutting means carried by such members for successively severing completely formed individual filled packages from said strip material, and a second cutting means associated with the first cutting means for cutting through a substantial length of said joint short of complete severance to provide an elongated integral handle attached at a narrow end thereof to each of said individual packages.

19. A machine of the character described comprising cooperating mechanisms to manufacture filled bags forming packages with heat-sealed joints, and an integral handle-forming cutter carried by said mechanism for transforming the said seam joints to provide a sufficient length of partially severed seamed joint structure attached by an end thereof to each of said bags.

20. In a mechanism of the character described, means for heat sealing a closure seam joint of package bags, and means carried by said heat sealing means for severing the structure of said joint at a plurality of spaced portions, said severing means includes at least two cutting devices, one of said devices being so constructed and arranged to sever the seam joint short of complete detachment to form an elongated handle integrally attached at a narrow end thereof to the package bag.

21. In a machine of the character described for making packages from a preformed continuous tubular structure having a heat sealed seam joint formed lengthwise thereof, a plurality of pressure members, heating means provided in said pressure members, means for bringing said pressure means in and out of engagement with the tubular structure to form a heat sealed bottom closure seam joint of a bag section unit thereof, a plurality of severing means cooperating with said pressure means, one of said latter means for completely cutting off the bag section unit from the tubular structure along said seam joint, the other severing means for through-cutting a midportion of said seam joint short of detachment to form a dependent integral handle therefrom, and including an additional severing means for extending the through-cutting along a portion of an adjacent heat sealed seam joint to lengthen the handle.

LOUIS BARNETT.